United States Patent [19]
Brandt

[11] 3,809,878
[45] May 7, 1974

[54] NOVEL FLASH CUBE ADAPTER
[75] Inventor: Edison R. Brandt, Boca Raton, Fla.
[73] Assignee: Polaroid Corporation, Cambridge, Mass.
[22] Filed: Feb. 23, 1973
[21] Appl. No.: 335,170

Related U.S. Application Data
[63] Continuation-in-part of Ser. No. 246,807, April 24, 1972, abandoned.

[52] U.S. Cl. ............... 95/11 L, 95/11.5 R, 240/1.3
[51] Int. Cl. .................... G03b 15/02, G03b 15/03
[58] Field of Search ............ 95/11 L, 11 R, 11.5 R; 240/1.3, 37.1

[56] References Cited
UNITED STATES PATENTS
3,465,138   9/1969   Long .................................. 95/11 R
3,633,476   1/1972   Yazaki et al. ....................... 95/11 R
3,598,984   8/1971   Slomski ............................... 240/1.3
3,514,587   5/1970   Engelsmann et al. ............ 95/11.5 X
3,466,992   9/1969   Wick et al. ........................ 95/11.5 R
3,517,595   6/1970   Wagner et al. ....................... 95/11.5

Primary Examiner—Robert P. Greiner

[57] ABSTRACT

A flash adapter for use in conjunction with a photographic camera including a flash unit entrance slot having a plurality of electrical contacts contained therein. The adapter includes a connector blade which, when inserted into the flash unit entrance slot instructs the camera's exposure control circuit to change from its ambient mode to its flash mode. When inserted, the blade makes electrical connection between the electrical contacts and a source of illumination mounted upon the flash adapter.

14 Claims, 9 Drawing Figures

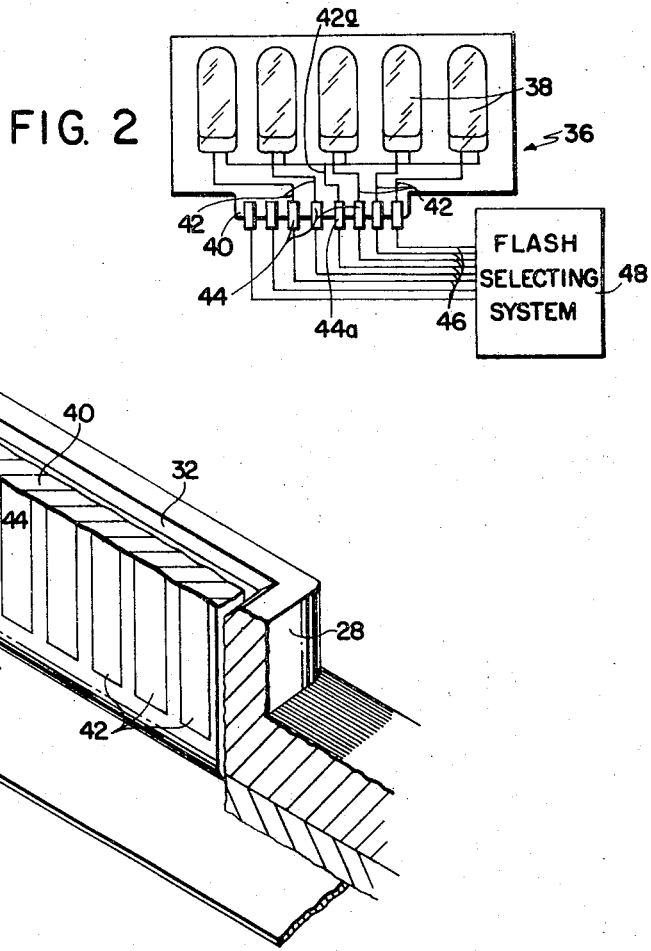
FIG. 2
FIG. 3a
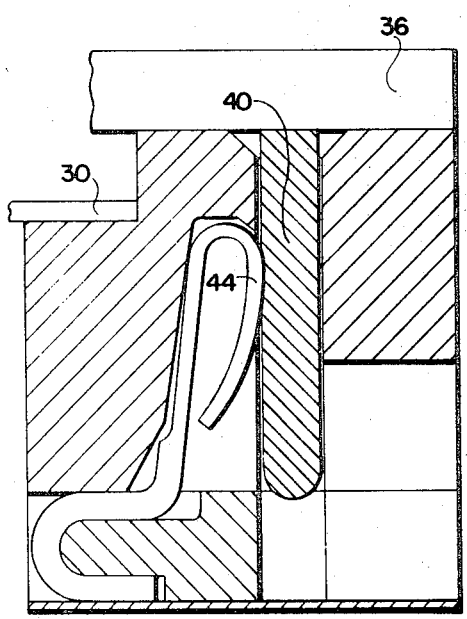
FIG. 3b

NOVEL FLASH CUBE ADAPTER

This case is a continuation-in-part of Ser. No. 246,807, filed Apr. 24, 1972 now abandoned.

BACKGROUND OF THE INVENTION

Photographic cameras have been developed by the assignee of this application which employ a linearly arrayed multi-lamp flash assembly. These cameras have been described in many issued patents, including United States Pat. Nos. 3,447,437; 3,543,662; 3,561,339; and 3,587,426.

These photographic cameras utilize as their source of illumination a disposable multi-lamp flash assembly having at least one array of flash lamps in similar orientation, as shown and described, for example, in United States Pat. Nos. 3,598,984 and 3,598,985. In this illumination system, the flash assembly is interfaced with a flash selecting system which selects the lamp or lamps to be fired when a firing command is received.

As shown in United States Pat. 3,598,984 and 3,598,985, the multi-lamp flash assembly includes a support structure from which extends a thin connector blade carrying a set of electrical terminals for the flash lamps. The connector blade of the flash assembly is inserted within an associated flash socket contained within the camera for electrically connecting the flash lamp terminals with the selecting system. The connector blade also includes an independent contact which instructs the camera's exposure control circuit to change from its ambient mode to its flash mode in which the flash selecting system is employed. A novel flash socket assembly of this type is shown and described in a copending application for United States Patent entitled "Flash Socket Assembly," Serial No. 204,831 by Edison R. Brandt, filed Dec. 12, 1971 and assigned in common herewith.

In the photographic industry, it has been found to be desirable to provide the customer with a variety of film and illumination alternatives. The individual tastes and likes of the camera user become important requirements in the development of a full photographic system. Accordingly, the present invention is addressed to flash adapters which may be employed with the above mentioned photographic cameras for adapting conventional illumination sources to the cameras. For example, the adapter may be configured to accept "flash cubes," electronic flash units, single flash bulbs, strobe flashes, etc. With regard to flash cubes, the adapter may provide for either automatic or manual indexing and an "empty indicator" which shows that all the flash bulbs contained therein have been used.

It is, therefore, a general object of this invention to provide a photographic flash adapter for a photographic camera having a specific flash unit entrance slot, the adapter being capable of adapting conventional flash illumination sources to the camera.

It is another object and feature of the present invention to provide an inexpensive and uncomplicated photographic flash adapter for use in conjunction with a photographic camera.

A further object and feature of the present invention is to provide a photographic flash adapter for use in conjunction with a photographic camera including a flash unit entrance slot having a plurality of electrical contacts contained therein for sequentially connecting flash lamps contained within a linearly arrayed multi-lamp flash assembly, the flash adapter comprising: a housing; a socket within the housing for receiving a source of flash illumination; a blade which is adapted to fit within the flash unit entrance slot for establishing electrical contact with at least two of the electrical contacts contained within the entrance slot; and an electrical connection between the source of flash illumination and the blade.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS:

FIG. 2 is a schematic view of a flash illumination system with which this invention is concerned;

FIG. 3a is a perspective view of a portion of the embodiment of the present invention and the photographic camera of FIG. 1;

FIG. 3b is a sectional view of the embodiment shown in FIG. 3a.

Figure 1:
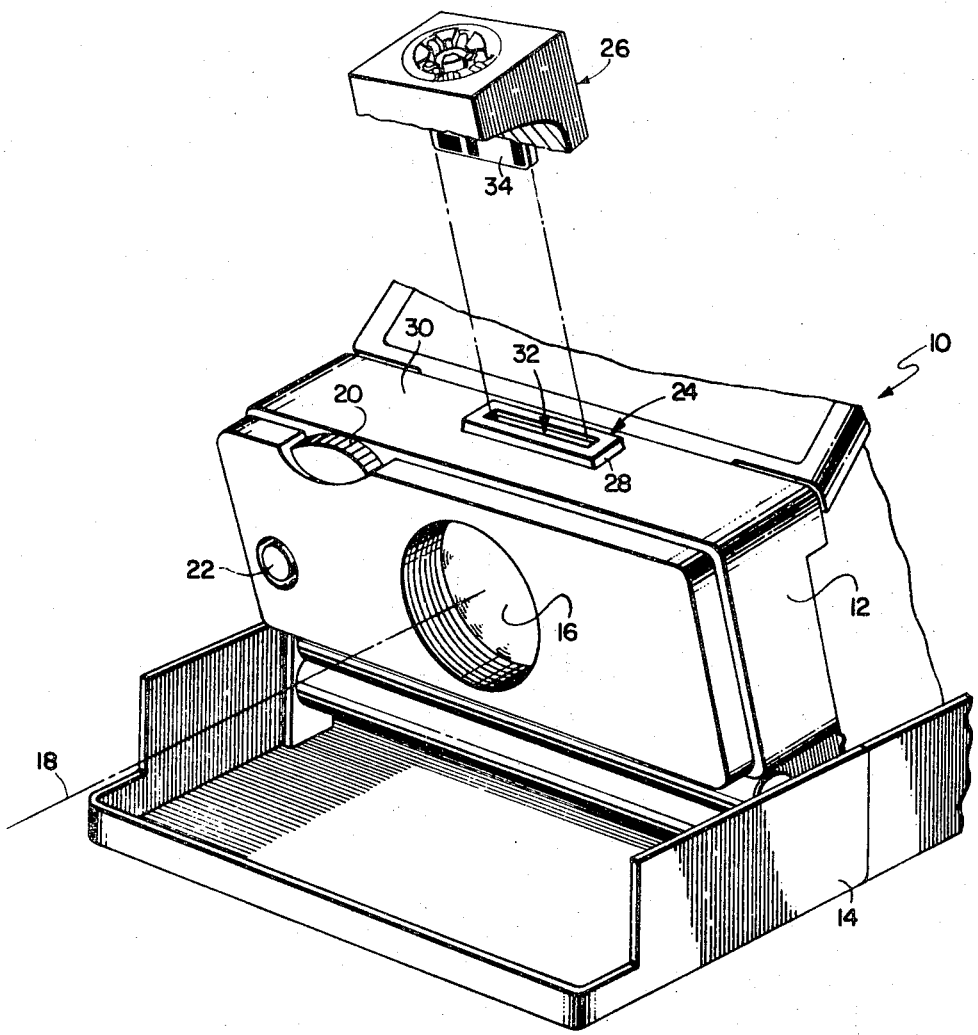
FIG. 1 is a perspective view of one embodiment of the present invention and a photographic camera with which it is employed.

DESCRIPTION OF THE PREFERRED EMBODIMENTS:

Referring to FIG. 1, there is illustrated portions of a photographic camera 10 of a type and construction as shown and described in the above-noted United States Pat. 3,447,437; 3,543,662; 3,561,339; and 3,587,426. Camera 10 is depicted as comprising a front assembly 12 mounted to pivot into a face-down position on a back housing plate 14 when camera 10 is folded.

Front assembly 12 is shown as including an objective lens 16 having a picture-taking axis 18, a focus wheel 20 for focusing the lens 16, and a shutter actuator 22. The front assembly 12 additionally includes a flash socket assembly 24 into which the flash adapter 26 of the present invention is fitted. A boss member 28 of the socket assembly 24 extends through a top wall 30 of front assembly 12 and defines an entrance slot 32 perpendicular to the picture-taking axis 18 for receiving a connector blade 34 of the flash adapter 26.

FIG. 2 represents a schematic diagram illustrating a linearly arrayed multi-lamp flash assembly 36 which is customarily employed with the camera 10. The flash assembly 36 consists of a first linear array of lamps 38 and a second oppositely facing linear array of lamps (not shown). Disposed on the bottom portion of assembly 36 is a connector blade 40 which extends downwardly therefrom and carries a set of terminal strips 42.

Positioned at one end of blade 40 is a connecting tab 43, the purpose of which will become more apparent as the description continues. A series of contact members 44, disposed within slot 32, are connected through a plurality of leads 46 to a flash selecting system 48 within front assembly 12. As shown in FIG. 2, eight contact members are provided for the five lamps in each array, one contact member being provided for each of the five lamps. The sixth terminal strip, designated by 42a in FIG. 2, is a ground terminal connected to a common ground wire for the lamps. Similarly, the contact member opposite terminal 42a, designated by 44a, is a contact ground for the flash selecting system 48 and is common to all leads 46. Two of the eight contact members 44 are so positioned within slot 32 as to contact the connecting tab 43 on blade 40. When this electrical contact has been made, the flash selecting system is activated and the camera's exposure control circuit is changed from its ambient mode to its flash mode. It should be noted that connecting tab 43 is not connected to any lamp and only serves to electrically instruct the camera's exposure control circuit to change to its flash mode.

The flash selecting system 48, shown in black box form in FIG. 2, may take any of a variety of forms but preferably comprises a static electronic flash sequencing or programming circuit, as shown for example in United States Pat. No. 3,618,492. A battery powered flash selecting system such as the system shown and described in the referenced United States Pat. No. 3,618,492 is capable of selecting a lamp or lamps in an operatively connected flash lamp assembly according to a predetermined sequencing or other selection program.

The flash selecting system described in the referenced patent has a resistance monitoring capability designed to detect a defective or ignited lamp characterized by a low resistance short circuit. If the resistance of a lamp having priority for ignition is below a necessary value, the flash selecting system will respond accordingly by avoiding that lamp and selecting another.

As mentioned previously, contacts 44 and 44a are disposed within the interior of slot 32 for electrically connecting flash selection system 48 with blade 34. In addition to connecting blade 34, contacts 44 and 44a provide a predetermined spring loaded force which is effective to retain blade 34 and its associated assembly (either the array 36 or the adapter 26) securely within the socket assembly 24. The contact members 44 and 44a are preferably composed of a spring material having high electrical conductivity and high tensile strength. Both FIGS. 3a and 3b illustrate contact members 44 as they might appear in their stressed state after the insertion of blade 40 of assembly 36.

Figure 4:
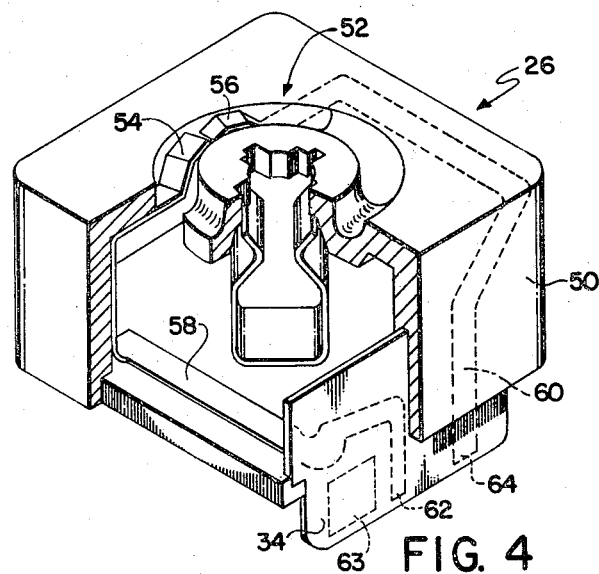
FIG. 4 is a perspective view of the preferred embodiment of the present invention with portions being cut away to more clearly define the invention.

Looking to FIG. 4, there is shown one embodiment of the present invention. Adapter 26 includes a housing 50, a blade 34 and a socket assembly, shown generally at 52. Socket assembly 52 is configured to accept standard sized "non-percussive" flash cubes and may be formed as any one of a variety of conventional flash cube socket supports known within the photographic art. Included within socket assembly 52 are two electrical contacts 54 and 56 for providing electrical connection to successive lamps within a flash cube. Two contact leads 58 and 60 are connected to contacts 54 and 56, respectively, and terminate as respective contact terminals 62 and 64 on blade 34. Contact terminals 62 and 64 are positioned upon blade 34 so as to make contact with two of the six contact members 44 contained within the interior of flash socket assembly 24. One of the terminals 62 or 64, however, must be located on blade 34 so as to make electrical contact with ground contact member 44a when blade 34 is inserted into slot 32. The remaining terminal may then be located in alignment with any one of the five remaining contact members 44. Also positioned on blade 34 is a connecting tab 63 for electrically instructing the camera's exposure control circuit to change from its ambient to its flash mode. It has been discovered by the applicant that it is of little consequence whether the remaining terminal makes contact with the first or last or some intermediate terminal for flash ignition timing. Specifically, flash selecting system 48 will seek out the first contact member 44 which is connected to a bulb which is capable of being ignited. In the present case, flash selecting system 48 will find that the same contact is connected to a bulb which is capable of being ignited. The flash selecting system 48 will find that all contacts prior to that contact will be open-circuited. (Due to the sequential rotation of the flash cube, a new ignitable flash lamp will have been rotated into an operable position.)

Figure 5A:
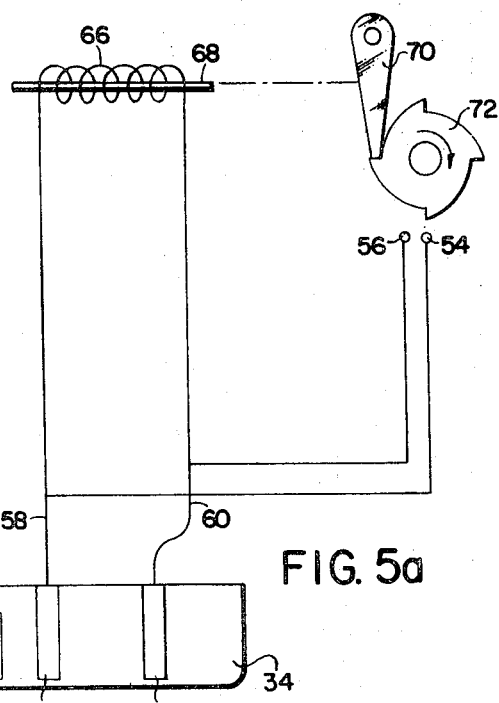
FIG. 5a is a schematic view of a second embodiment of the present invention.
Figure 5B:
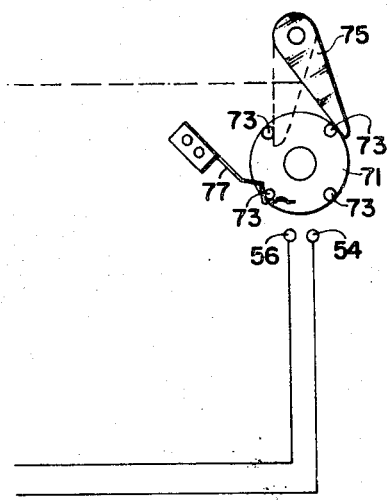
FIG. 5b is a schematic view of a third embodiment of the present invention.

While the embodiment discussed above is characterized in requiring manual rotation of the flash cube subsequent to the ignition of one lamp therein, it should be evident that automatic flash cube rotation may be included. For instance, FIG. 5a illustrates a schematic of a flash cube adapter according to the present invention in which the flash cube is prewound before a lamp contained therein is ignited. Connected to contact leads 58 and 60 is a solenoid 66. A core element 68 extends through the windings of solenoid 66 and is attached, by appropriate means as represented in dashed lines, to a pawl 70 which, in turn, is associated with a ratchet member 72. A flash cube (not shown) is rotatably mounted with ratchet member 72 which is biased clockwise by a coil spring (not shown). Subsequent to depression of shutter release button 22, a battery (not shown) is connected across terminals 62 and 64. A lamp contained within the flash cube connected to contacts 54 and 56 is then ignited. As the lamp is ignited, solenoid 66 is momentarily energized and draws in core 68. Pawl 70 is pivoted out of contact with ratchet 72 thereby permitting a 90 degree rotation of ratched 72 and the flash cube. Before further rotation can occur, however, solenoid 66 is de-energized, thereby permitting core 68 to be extracted by appropriate means such as a spring (not shown). Pawl 70 is then returned to its "latched" association with ratched 72 and rotation of ratchet 72 and the flash cube is stopped. It may also be apparent to those skilled in the art that an "empty" indicator can be easily incorporated within the adapter, resulting in an askew positioning of the flash cube subsequent to all four lamps being ignited. Additionally, pawl 70 may be employe for rotating ratchet 72 by itself, employed thereby obviating the need for a prewound mechanism. Such a mechanism is schematically shown in FIG. 5b. A rotatable carrier 71, to which a flash cube is attached, contains four posts 73. A pawl member 75 is actuable to rotate carrier 71 counterclockwise by the engagement between member 75 and one post 73. A detent spring 77 is also provided for limiting the rotation of carrier 71 to 90 degrees, thereby placing successive lamps in contact with contacts 54 and 56.

Still other mechanisms may be employed for providing a self-rotating socket. For instance, a bimetallic element may be incorporated which is actuable subsequent to the ignition of a lamp to permit a 90° rotation to the flash cube. A mechanism of this type is shown and described in United States Pat. No. 3,583,301.

Figure 6:
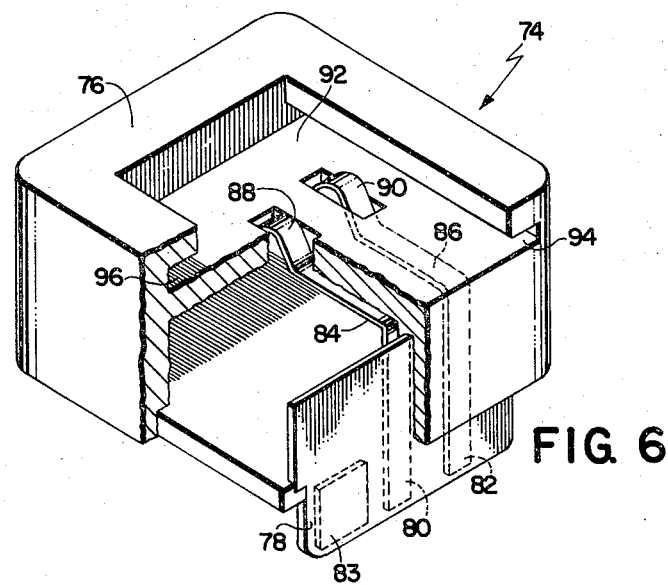
FIG. 6 is a perspective view of another embodiment of the present invention with portions cut-away to show internal structure.

Another embodiment of the present invention is illustrated in FIG. 6. Commonly known as a "hot shoe," the adapter 74 shown in FIG. 6 is configured to adapt electronic flashes, stroboscopic units, and other flash cube adapters to camera 10. Like the flash cube adapter shown in FIG. 4, adapter 74 includes a housing 76, a blade 78, two contact terminals 80 and 82, and a connecting tab 83. A pair of contact leads 84 and 86 electrically connect terminals 80 and 82, respectively, to terminus points 88 and 90. Terminus points 88 and 90 provide electrical connection to the unit (not shown) to be inserted within a cut-away portion 92 on the top of adapter 74. Two lateral slots 94 and 96 are provided for securing the unit to the adapter and for insuring constant electrical contact between the unit and terminus points 88 and 90. The positioning of contact terminals 80 and 82 on blade 78 must be similar to the positioning of terminals 62 and 64 on adapter 26 for the reasons discussed above.

Figure 7:
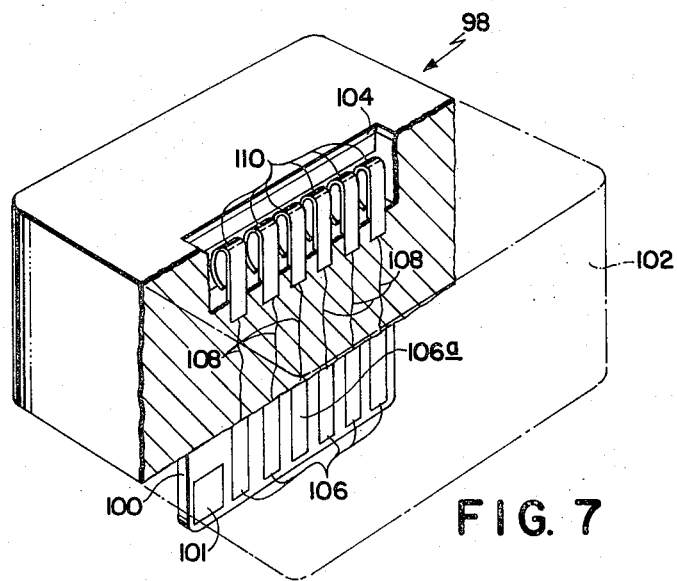
FIG. 7 is a perspective view of yet another embodiment of the present invention with protions cut-away to show the invention more precisely.

FIG. 7 illustrates still another embodiment of the present adapter which is characterized in accepting a linearly arrayed multi-lamp flash assembly. Formed as an extender, the adapter shown generally at 98 includes a blade 100, a housing 102 and a slot 104 formed on the upward portion of adapter 98. Blade 100 contains six contact terminals 106 including a ground terminal 106a and a connecting tab 101. Blade 100 and terminals 106 are configured having the same form as the blade 40 and contact terminals 44 of the linearly arrayed multi-lamp flash assembly shown in FIG. 2. A series of six contact leads 108 connect contact terminals 106 with contact members 110 located within slot 104. Slot 104 and contact members 110 are configured having the same form as members 44 and slot 32 of the flash socket assembly 24 of FIG. 1. Therefore, a multi-lamp flash assembly such as assembly 36 of FIG. 2 is inserted into slot 104. The blade and terminal contacts of the assembly 36 are electrically connected through contact members 110 and contact leads 108 to contact terminals 106 which are in turn connected to the socket assembly 24 of camera 10. Due to the fact that blade 100 includes connecting tab 101, there is no need to provide two additional contact members 110 within slot 104 for connecting the connecting tab (not shown) of the blade of the assembly to be inserted. As a result, only those six contacts 110 necessary to connect the lamps need be provided.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic flash adapter for use in conjunction with a photographic camera having an ambient mode and a flash mode, said photographic camera including a flash unit entrance slot having a plurality of electrical contacts contained therein for establishing an electrical connection with flash lamps contained within a linearly arrayed multi-lamp flash assembly for sequential ignition, said flash adapter comprising:
   a housing;
   socket means contained within said housing for releasably supporting at least a single source of illumination manually insertable into, and subsequently, manually removable from said socket means;
   blade means, adapted to fit within said flash unit entrance slot, said blade means including a plurality of terminal means located on one side of said blade means for establishing electrical contact with at least two of said plurality of electrical contacts contained within said flash unit entrance slot, one of said electrical contacts being a common contact;

means located on said blade means for electrically changing said photographic camera from its said ambient mode to its said flash mode when said blade means of said flash adapter is inserted in said flash unit entrance slot; and
   means for establishing electrical connection between said source of illumination and said terminal means.

2. The photographic flash adapter according to claim 1 in which the engagement between said blade means and said electrical contacts is operative to provide support for said flash adapter when said flash adapter is united with said photographic camera.

3. The photographic flash adapter according to claim 2 in which said blade means is configured having a size essentially equal to that of said entrance slot, the engagement between said blade means and said entrance slot providing support for said adapter when said adapter is united with said photographic camera.

4. The photographic flash adapter according to claim 1 in which said means for electrically changing said camera to its flash mode electrically closes a circuit between two of said electrical contacts, said means for electrically changing said camera to its flash mode being formed as an enlarged terminal contact on said blade means.

5. The photographic flash adapter according to claim 1 in which said terminal means of said blade means is formed as two electrical terminals for establishing electrical contact with said one common electrical contact and with one other of said plurality of electrical contacts.

6. The photographic flash adapter according to claim 5 in which said socket means is configured so as to releasably support and accept a flash cube.

7. The photographic flash adapter according to claim 6 in which said two electrical terminals are electrically connected to respective contacts within said socket means for electrically connecting an individual lamp contained within said flash cube.

8. The photographic flash adapter according to claim 7 including means for manually rotating said flash cube subsequent to the ignition of a lamp contained therein for connecting a next lamp to said contacts within said socket means.

9. The photographic flash adapter according to claim 7 including means for automatically rotating said flash cube subsequent to the ignition of a lamp contained therein for connecting a next lamp.

10. The photographic flash adapter according to claim 5 in which said socket means is formed as a hot shoe.

11. The photographic flash adapter according to claim 5 in which said socket means is formed as a flash unit entrance slot for releasably retaining a linearly arrayed multi-lamp flash assembly, said flash unit entrance slot being configured substantially the same as said flash unit entrance slot of said photographic camera.

12. Photographic flash adapter for use in conjunction with a photographic camera having an ambient mode and a flash mode, said photographic camera including a flash unit entrance slot having a plurality of electrical contacts contained therein for establishing an electrical connection with flash lamps contained within a linearly arrayed multi-lamp flash assembly for sequential ignition, said flash adapter comprising:
 a housing;
 flash cube socket means contained within said housing for releasably supporting a flash cube;
 blade means, adapted to fit within said flash unit entrance slot, said blade means including a plurality of terminal means located on one side of said blade means for establishing electrical contact with at least two of said plurality of electrical contacts contained within said flash unit entrance slot, one of said electrical contacts being a common contact;

means located on said blade means for electrically changing said photographic camera from its said ambient mode to its said flash mode when said blade means of said flash adapter is inserted in said flash unit entrance slot; and
 means for establishing electrical connection between individual lamps contained within said flash cube and said terminal means.

13. Photographic flash adapter for use in conjunction with a photographic camera having an ambient mode and a flash mode, said photographic camera including a flash unit entrance slot having a plurality of electrical contacts contained therein for establishing an electrical connection with flash lamps contained within a linearly arrayed multi-lamp flash assembly for sequential ignition, said flash adapter comprising:
 a housing;
 socket means contained within said housing, said socket means being configured as a hot shoe;
 blade means, adapted to fit within said flash unit entrance slot, said blade means including a plurality of terminal means located on one side of said blade means for establishing electrical contact with at least two of said plurality of electrical contacts contained within said flash unit entrance slot, one of said electrical contacts being a common contact;

means located on said blade means for electrically changing said photographic camera from its said ambient mode to its said flash mode when said blade means of said flash adapter is inserted in said flash unit entrance slot; and
 means for establishing electrical connection between said hot shoe and said terminal means.

14. Photographic flash adapter for use in conjunction with a photographic camera having an ambient mode and a flash mode, said photographic camera including a flash unit entrance slot having a plurality of electrical contacts contained therein for establishing an electrical connection with flash lamps contained within a linearly arrayed multi-lamp flash assembly for sequential ignition, said flash adapter comprising:
 a housing;
 socket means contained within said housing for releasably supporting a linearly arrayed multi-lamp flash assembly;
 blade means, adapted to fit within said flash unit entrance slot, said blade means including a plurality of terminal means located on one side of said blade means for establishing electrical contact with at least two of said plurality of electrical contacts contained within said flash unit entrance slot, one of said electrical contacts being a common contact;

means located on said blade means for electrically changing said photographic camera from its said ambient mode to its said flash mode when said blade means of said flash adapter is inserted in said flash unit entrance slot; and
 means for establishing electrical connection between said flash assembly and said terminal means.

* * * * *